United States Patent
Tsai (10) Patent No.: US 8,253,551 B2
(45) Date of Patent: Aug. 28, 2012

(54) DRIVING MONITORING DEVICE AND METHOD UTILIZING THE SAME

(75) Inventor: Ying-Chuan Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 373 days.

(21) Appl. No.: 12/730,236

(22) Filed: Mar. 24, 2010

(65) Prior Publication Data

US 2011/0121960 A1    May 26, 2011

(30) Foreign Application Priority Data

Nov. 24, 2009   (CN) .......................... 2009 1 0310326

(51) Int. Cl.
    B60Q 1/00     (2006.01)
    G08B 23/00    (2006.01)
    G08G 1/017    (2006.01)

(52) U.S. Cl. ........ 340/439; 340/438; 340/575; 340/576; 340/937

(58) Field of Classification Search ........................ None
    See application file for complete search history.

(56) References Cited

U.S. PATENT DOCUMENTS

| | | | | |
|---|---|---|---|---|
| 6,575,902 B1 * | 6/2003 | Burton | ........................ | 600/300 |
| 6,724,920 B1 * | 4/2004 | Berenz et al. | ................. | 382/118 |
| 7,027,621 B1 * | 4/2006 | Prokoski | ....................... | 382/118 |
| 7,202,793 B2 * | 4/2007 | Grace et al. | ................... | 340/576 |
| 7,510,038 B2 * | 3/2009 | Kaufmann et al. | ........... | 180/169 |
| 7,639,148 B2 * | 12/2009 | Victor | ........................... | 340/576 |
| 7,711,464 B2 * | 5/2010 | Kaufmann | ...................... | 701/41 |
| 7,719,431 B2 * | 5/2010 | Bolourchi | ..................... | 340/576 |
| 7,734,419 B2 * | 6/2010 | Kondoh | ......................... | 701/301 |
| 7,821,382 B2 * | 10/2010 | Kameyama | ................. | 340/425.5 |
| 2010/0295670 A1 * | 11/2010 | Sato et al. | ..................... | 340/458 |

* cited by examiner

*Primary Examiner* — Daniel Wu
*Assistant Examiner* — Emily C Terrell
(74) *Attorney, Agent, or Firm* — Altis Law Group, Inc.

(57) ABSTRACT

A driving monitoring device and method includes controlling a camera to capture a face image of a driver, identifying the face image to determine if the driver is awake, and controlling a camera to capture a first image of the steering wheel. The driving monitoring device and method further includes identifying a steering wheel region and two hand regions, confirming one or more sub regions of the steering wheel region corresponding to the two hand regions, determining that the driver drives the vehicle inappropriately if the confirmed sub regions do not match standard positions, and outputting alert signals to prompt the driver.

18 Claims, 7 Drawing Sheets

DRIVING MONITORING DEVICE AND METHOD UTILIZING THE SAME

BACKGROUND

1. Technical Field

Embodiments of the present disclosure relate to monitoring technology, and more particularly to a driving monitoring device and a method utilizing the driving monitoring device.

2. Description of Related Art

A driver's improper operations may result in traffic accidents, such as driver fatigue, or drunk driving. It is important to identify whether a driver is alert while driving a vehicle and give warning to the driver if they are not alert, to reduce traffic accidents.

What is needed, therefore, is a driving monitoring device and a method utilizing the driving monitoring device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
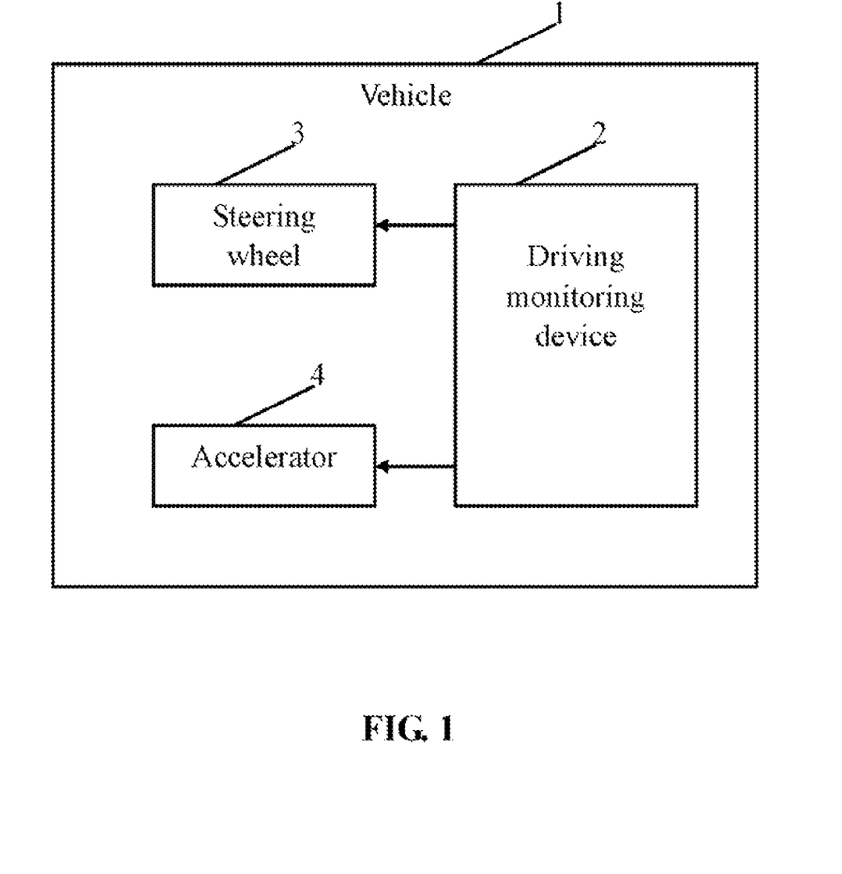
FIG. 1 is a block diagram of one embodiment of a vehicle including a driving monitoring device.

FIG. 1 is a block diagram of one embodiment of a vehicle 1 including a driving monitoring device 2. The vehicle 1 may be a car, for example. The vehicle 1 further includes a steering wheel 3 and an accelerator 4. In one embodiment, the driving monitoring device 2 may be used to identify if a driver drives the vehicle appropriately, output alert signals to prompt the driver if the driver drives the vehicle inappropriately, and cut off the accelerator 4 directly to ensure the safety of the driver if the driver does not adjust driving poses in time. For example, the driving monitoring device 2 may determine if the driver is awake and if two hands of the driver are on the appropriate positions of the steering wheel 3. Detailed descriptions will be provided below.

Figure 2:
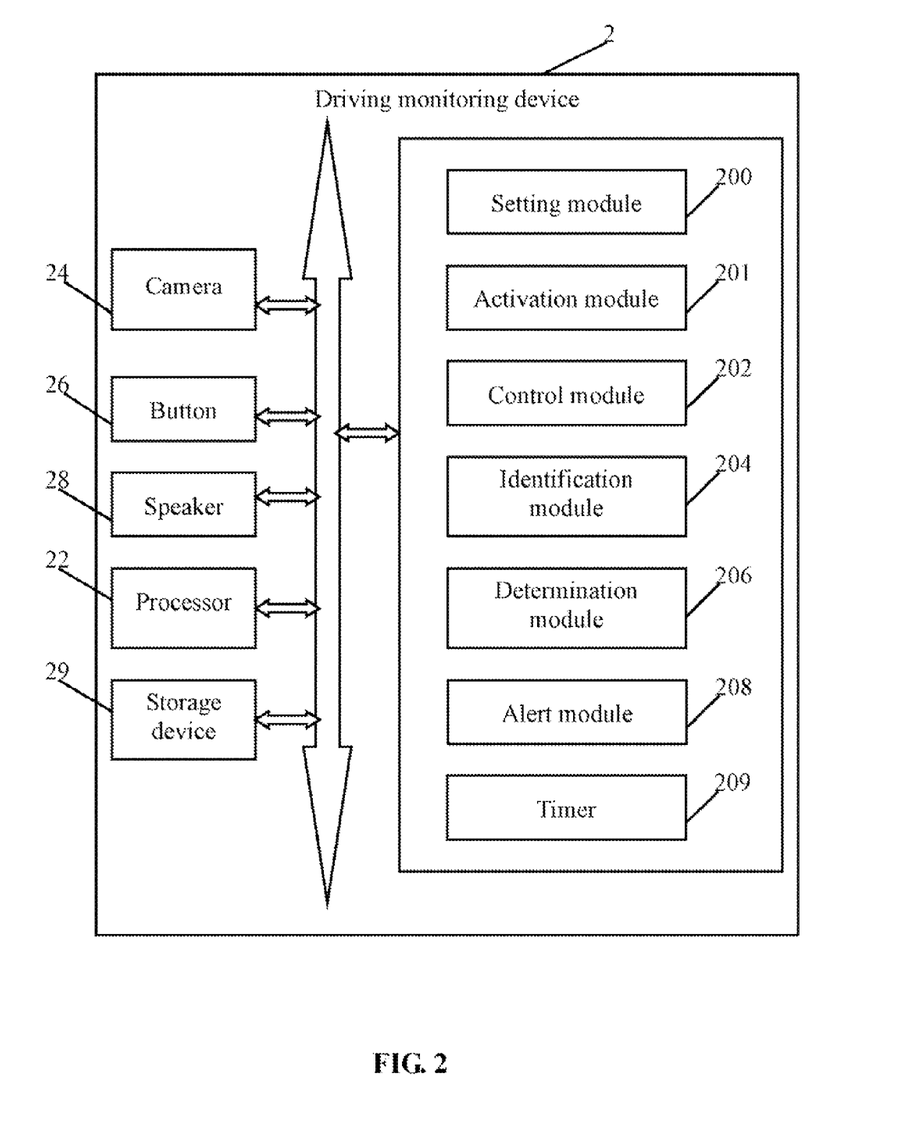
FIG. 2 is a block diagram of one embodiment of the driving monitoring device of FIG. 1.

FIG. 2 is a block diagram of one embodiment of the driving monitoring device 2 of FIG. 1. In one embodiment, the driving monitoring device 2 may be an electronic device installed in the vehicle 1. The driving monitoring device 2 includes a processor 22, a camera 24, a button 26, a speaker 28, and a storage device 29. The processor 22 executes one or more computerized operations of the driving monitoring device 2 and other applications, to provide the functions of the driving monitoring device 2.

The camera 24 captures various images (e.g., a face image of the driver) to be analyzed by the driving monitoring device 2. The button 26 may be pressed by the driver to enable the driving monitoring device 2. In one embodiment, a first instruction may be sent to switch on the camera 24 in response to receiving press signals from the button 26. The speaker 28 may be used to output audio alert signal to wake up the user or prompt the user to adjust current driving poses. In one embodiment, the audio alert signals may be a song, or prerecorded sounds, for example.

The storage device 29 stores one or more programs of the driving monitoring device 2, and various kinds of data, such as setting data, the captured images, for example. In one embodiment, the storage device 29 may be a memory of the driving monitoring device 2.

In one embodiment, the driving monitoring device 2 further includes a setting module 200, an activation module 201, a control module 202, an identification module 204, a determination module 206, an alert module 208, and a timer 209. The modules 200, 201, 202, 204, 206, 208, and 209 may comprise one or more computerized codes to be executed by the processor 22 to perform one or more operations of the driving monitoring device 2. Details of these operations will be provided below.

The setting module 200 sets a first angle of the camera to capture a face of a driver, and sets a threshold value to determine if the driver is awake. The setting module 200 also sets a second angle of the camera to capture a steering wheel of the vehicle 3, sets a division standard to divide a steering wheel region, and sets standard positions of hands of the driver on the steering wheel 3.

Figure 3:
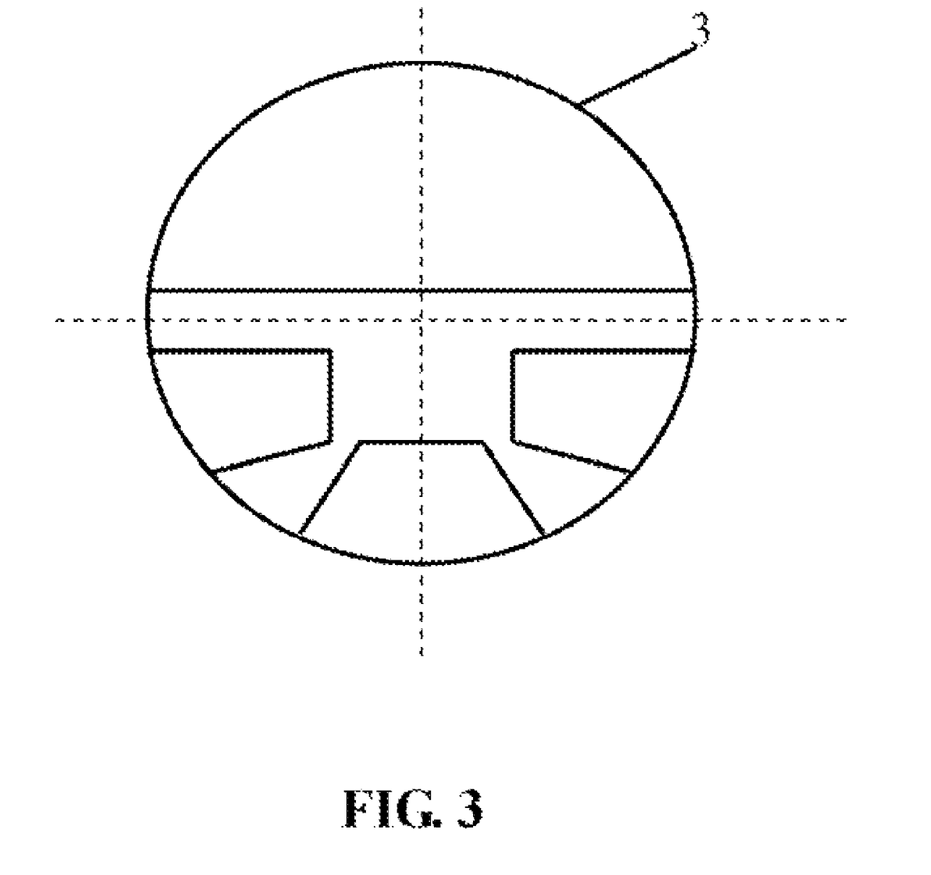
FIG. 3 is a schematic diagram of one embodiment of a steering wheel region.

In one embodiment, as shown in FIG. 3, the division standard may divide the steering wheel region into a left upper sub region, a left lower sub region, a right upper sub region, and a right lower sub region according to two perpendicular lines. In one embodiment, the standard positions of the hands of the driver on the steering wheel 3 may comprise a left hand of the driver on the left upper sub region while the right hand of the driver on the right lower sub region. In addition, the left hand of the driver may be on the left lower sub region while the right hand of the driver may be on the right upper sub region.

In another embodiment, the division standard and the standard positions may be preset by the setting module 200 according to user habits or actual requirements. For example, the division standard may divide the steering wheel region into nine sub regions. The driver may put the left hand at the 10 o'clock position, and put right hand at the 2 o'clock position, then the standard positions of the hands of the driver on the steering wheel 3 may be a left hand of the driver on the left upper sub region and the right hand of the driver on the right upper sub region.

The activation module 201 sends a first instruction in response to receiving a press signal from the button 26. The first instruction may be preset by the setting module 200 to enable the driving monitoring device 2. The control module 202 controls the camera 24 to capture a face image of the driver at the first angle according to the first instruction.

The identification module 204 acquires the face image, and identifies a facial region in the face image. In one embodiment, the identification module 204 identifies the facial region in the face image using a skin-color algorithm. That is, the face region is defined according to a range of skin colors of people's face. The range of the skin colors are calculated according to the following equation of:

$$Skin_{color}(x, y) = \begin{cases} 1, \text{ if } [Cr(x, y) \in Skin_{Cr}] \cap [Cb(x, y) \in Skin_{Cb}] \\ 0, \text{ otherwise.} \end{cases}$$

If the value of $Skin_{color}(x, y)$ is 1, the identified range of the face color is determined as the skin color. Then the identification module 204 sets the color of the identified range as white. If the value of $Skin_{color}(x, y)$ is not 1, the identified range of the face color is determined as being a non-skin color. The identification module 204 sets the color of the identified range as black. After identifying the face region, the identification module 204 defines a face-rectangular representative of a maximal of the face region. The face-rectangular is a sampling space of characteristics within the face region, which is identified by the identification module 204 according to the characteristics within the face region.

The identification module 204 further locates an eye region from the identified face region. Firstly, the identification module 204 locates a rough eye region by detecting two circle shapes having deeper color than a neighborhood from the identified face region. After detecting the rough eye region, the identification module 204 utilizes an algorithm, such as the Sobel algorithm to enhance the border of the eye region and further blacken the eye region. Then a binarization process processes the eye region. In one embodiment, the binarization process may be an image binarizing algorithm based on a mathematical morphology.

After performing the binarization process, the identification module 204 samples the border of the eye region to obtain an outline of the eye region by an algorithm, such as the Snake algorithm. The outline of the eye region is then utilized to define an eye-rectangular representative of a maximal of the eye region, and thus the identification module 204 may obtain a height (H) and a width (W) of the eye-rectangular. The identification module 204 further calculates a ratio (H/W) of the height and the width of the eye region.

The determination module 206 determines if the driver is awake by comparing the calculated ratio with the threshold value. If the calculated ratio is larger than the threshold value, the determination module 206 determines that the driver is awake. If the calculated ratio is not larger than the threshold value, the determination module 206 determines that the driver is not awake.

In a first embodiment, the alert module 208 outputs alert signals to prompt the driver if the driver is not awake. As mentioned above, the alert signals may be audio alert signals output by the speaker 28, such as the prerecorded sounds (e.g., "Be careful!"), a predetermined song, for example. The alert module 208 may further cut off the accelerator 4 of the vehicle 1. For example, the alert module 208 may cut off the accelerator 4 by controlling a damper brake that connects to the accelerator 4.

In a second embodiment, the activation module 201 invokes a second instruction if the determination module 206 determines that the driver is not awake. The second instruction may be preset by the setting module 200. The control module 202 controls the camera move to the second angle, and captures a first image of the steering wheel 3 at the second angle according to the second instruction.

The identification module 204 identifies a steering wheel region and two hand regions, divides the steering wheel region into a plurality of sub regions according to the division standard, and confirms one or more sub regions corresponding to the two hand regions. In one embodiment, the identification module 204 identifies the steering wheel region and the hand regions using a sample match method. Multiple image samples are previously stored in the storage device 29, for example, the camera 24 captures multiple images of the steering wheel 3, and multiple images of hands on different positions of the steering wheel 3.

The setting module 200 may set a comparison proportion. The identification module 204 confirms a sub region corresponding to a hand region if a proportion between acreages of the hand region and the sub region is larger than the comparison proportion by comparing the first image with image samples in the storage device 29.

The determination module 206 determines if the confirmed sub regions match the standard positions. If the confirmed sub regions match the standard positions, the determination module 206 determines that the driver drives the vehicle 1 appropriately. If the confirmed sub regions do not match the standard positions, the determination module 206 determines that the driver drives the vehicle 1 inappropriately.

The alert module 208 outputs the alert signals to prompt the driver if the driver drives the vehicle 1 inappropriately. As mentioned above, the alert module 208 may further cut off the accelerator 4 of the vehicle 1.

In a third embodiment, the setting module 200 further sets a time interval to determine if the driver has adjusted a driving pose after outputting the alert signals. The timer 209 starts timing if the determination module 206 determines that the driver drives the vehicle inappropriately. The activation module 201 invokes the second instruction when the time interval has been reached.

The control module 202 controls the camera 24 to capture a second image of the steering wheel 3 at the second angle according to the second instruction. The identification module 204 identifies a steering wheel region and two hand regions in the second image, divides the steering wheel region into a plurality of sub regions according to the division standard, and confirms one or more sub regions corresponding to the hand regions.

The determination module 206 determines if the driver has adjusted the driving pose by determining if the confirmed sub regions match the standard positions. If the confirmed sub regions match the standard positions, the determination module 206 determines that the driver has adjusted the driving pose, and the alert module 208 stops outputting the alert signals. If the confirmed sub regions do not match the standard positions, the determination module 206 determines that the driver has not adjusted the driving pose, and the alert module 208 cuts off the accelerator 4 of the vehicle 1.

Figure 4:
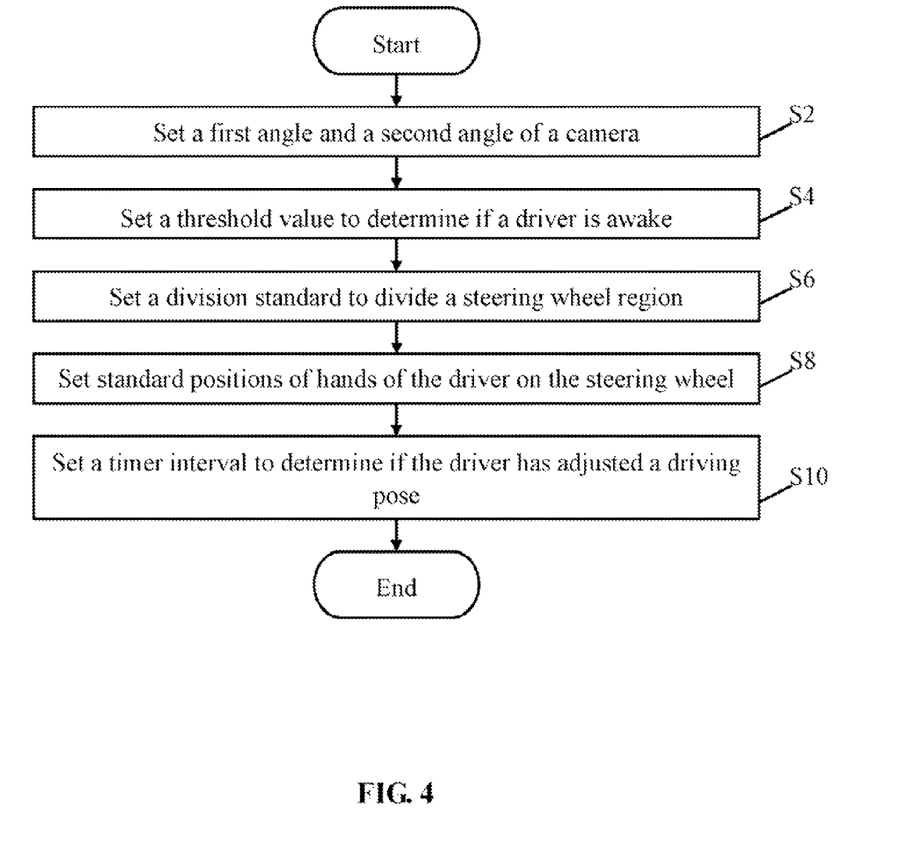
FIG. 4 is a flowchart of an embodiment of a method for setting data using the driving monitoring device of FIG. 2.

FIG. 4 is a flowchart of an embodiment of a method for setting data using the driving monitoring device 2 of FIG. 2. Depending on the embodiment, additional blocks may be added, others removed, and the ordering of the blocks may be replaced.

In block S2, the setting module 200 sets a first angle of the camera to capture a face of a driver, and sets a second angle of the camera to capture a steering wheel of the vehicle 3.

In block S4, the setting module 200 sets a threshold value to determine if the driver is awake.

In block S6, the setting module 200 sets a division standard to divide a steering wheel region. As shown in FIG. 3, the division standard may divide the steering wheel region into a left upper sub region, a left lower sub region, a right upper sub region, and a right lower sub region according to two perpendicular lines.

In block S8, the setting module 200 sets standard positions of hands of the driver on the steering wheel 3. As mentioned above, the standard positions of the hands of the driver on the steering wheel 3 may comprise a left hand of the driver on the left upper sub region while the right hand of the driver on the right lower sub region. In addition, the left hand of the driver may be on the left lower sub region while the right hand of the driver may be on the right upper sub region.

In block S10, the setting module 200 further sets a time interval to determine if the driver has adjusted a driving pose.

Figure 5:
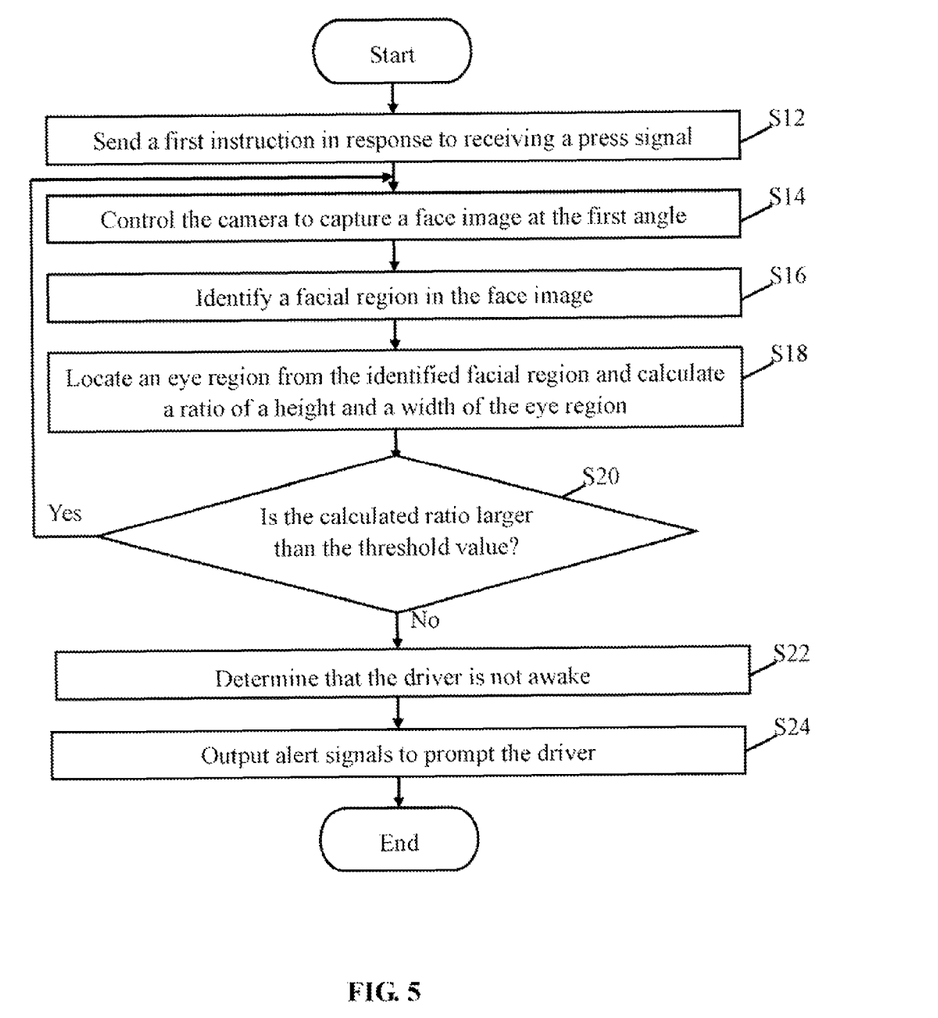
FIG. 5 is a flowchart of a first embodiment of a driving monitoring method using the driving monitoring device of FIG. 2.

FIG. 5 is a flowchart of a first embodiment of a driving monitoring method using the driving monitoring device 2 of FIG. 2. Depending on the embodiment, additional blocks may be added, others removed, and the ordering of the blocks may be replaced.

In block S12, The activation module 201 sends a first instruction in response to receiving a press signal from the button 26. As mentioned above, the first instruction may be preset by the setting module 200 to enable the driving monitoring device 2.

In block S14, the control module 202 controls the camera 24 to capture a face image of the driver at the first angle according to the first instruction.

In block S16, the identification module 204 acquires the face image, and identifies a facial region in the face image. As mentioned above, the identification module 204 identifies the facial region in the face image using a skin-color algorithm. Details of the identification procedure are described above.

In block S18, the identification module 204 locates an eye region from the identified face region, and calculates a ratio (H/W) of the height and the width of the eye region. In block S20, the determination module 206 determines if the calculated ratio is larger than the threshold value. If the calculated ratio is larger than the threshold value, that is, the driver is awake, and then the procedure returns to block S14.

If the calculated ratio is not larger than the threshold value, in block S22, the determination module 206 determines that the driver is not awake. In block S24, the alert module 208 outputs alert signals to prompt the driver if the driver is not awake. As mentioned above, the alert signals may be audio alert signals output by the speaker 28, such as the prerecorded sounds (e.g., "Be careful!"), a predetermined song, for example.

Figure 6:
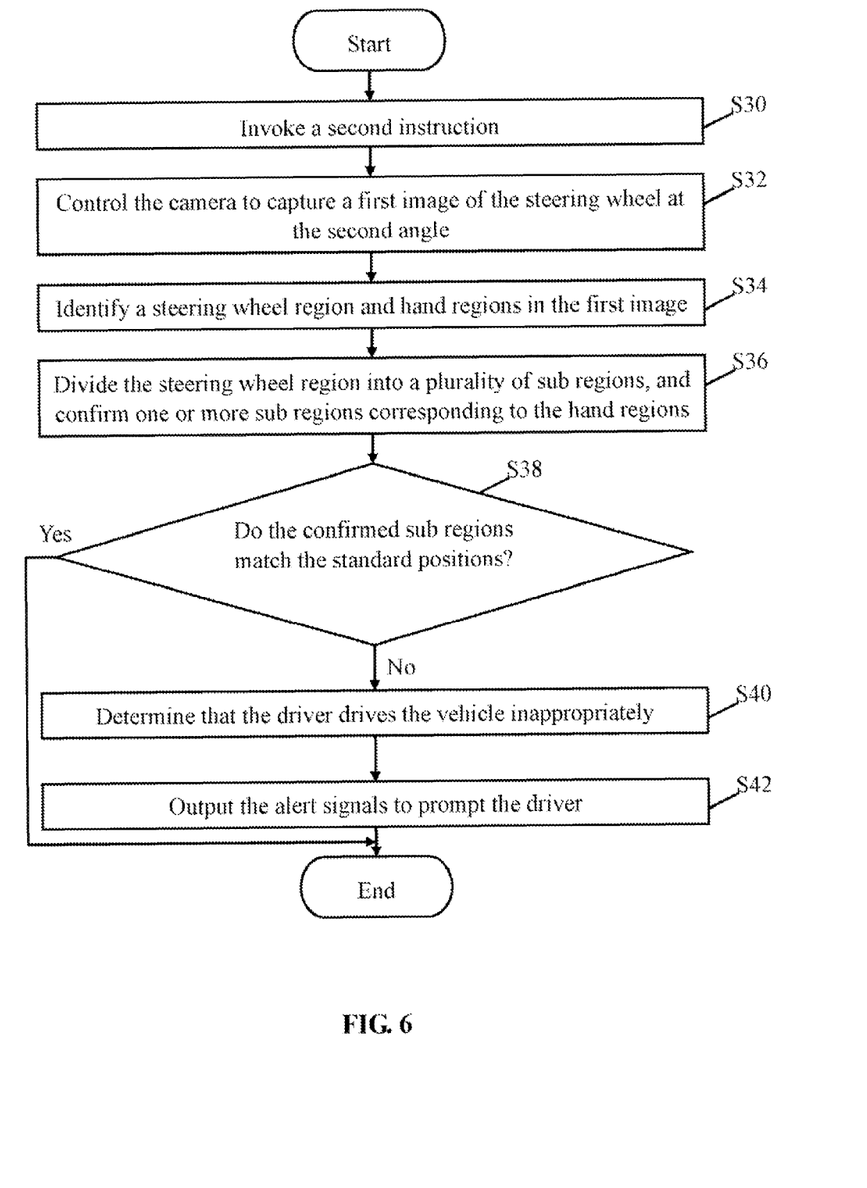
FIG. 6 is a flowchart of a second embodiment of a driving monitoring method using the driving monitoring device of FIG. 2.

FIG. 6 is a flowchart of a second embodiment of a driving monitoring method using the driving monitoring device 2 of FIG. 2. Depending on the embodiment, additional blocks may be added, others removed, and the ordering of the blocks may be replaced.

In block S30, the activation module 201 invokes a second instruction if the determination module 206 determines that the driver is not awake. As mentioned above, the second instruction may be preset by the setting module 200.

In block S32, the control module 202 controls the camera 24 move to the second angle, and capture a first image of the steering wheel 3 at the second angle according to the second instruction.

In block S34, the identification module 204 identifies a steering wheel region and two hand regions in the first image. In one embodiment, the identification module 204 may identify the steering wheel region and the hand regions using a sample match method. Multiple image samples may be previously stored in the storage device 29.

In block S36, the identification module 204 divides the steering wheel region into a plurality of sub regions according to the division standard, and confirms one or more sub regions corresponding to the two hand regions.

In block S38, the determination module 206 determines if the confirmed sub regions match the standard positions. If the confirmed sub regions match the standard positions, that is, the driver drives the vehicle 1 appropriately, and then the procedure ends.

If the confirmed sub regions do not match the standard positions, in block S40, the determination module 206 determines that the driver drives the vehicle 1 inappropriately. In block S42, the alert module 208 outputs the alert signals to prompt the driver.

Figure 7:
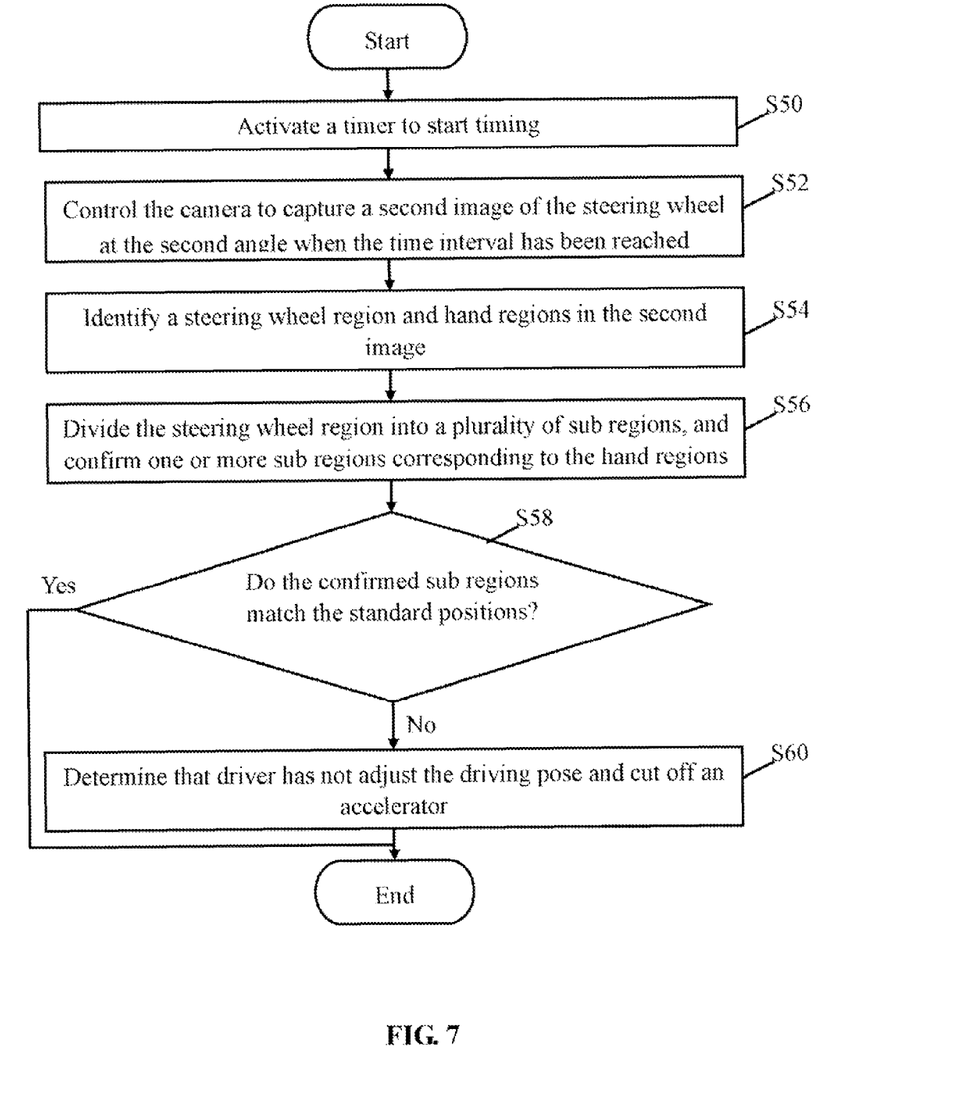
FIG. 7 is a flowchart of a third embodiment of a driving monitoring method using the driving monitoring device of FIG. 2.

FIG. 7 is a flowchart of a third embodiment of a driving monitoring method using the driving monitoring device 2 of FIG. 2. Depending on the embodiment, additional blocks may be added, others removed, and the ordering of the blocks may be replaced.

In block S50, the timer 209 is activated to start timing if the determination module 206 determines that the driver drives the vehicle inappropriately.

In block S52, the activation module 201 invokes the second instruction when the time interval has been reached, and the control module 202 controls the camera 24 to capture a second image of the steering wheel 3 at the second angle according to the second instruction.

In block S54, the identification module 204 identifies a steering wheel region and two hand regions in the second image.

In block S56, the identification module 204 divides the steering wheel region into a plurality of sub regions according to the division standard, and confirms one or more sub regions corresponding to the hand regions.

In block S58, the determination module 206 determines if the driver has adjusted the driving pose. If the confirmed sub regions match the standard positions, that is, the driver has adjusted the driving pose, the procedure ends.

If the confirmed sub regions do not match the standard positions, in block S60, the determination module 206 determines that the driver has not adjusted the driving pose, and the alert module 208 cuts off the accelerator 4 of the vehicle 1.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A driving monitoring method using a driving monitoring device in a vehicle, the driving monitoring device comprising a camera and a button, the method comprising:

setting a first angle of the camera to capture a face of a driver, and setting a threshold value to determine if the driver is awake;

setting a second angle of the camera to capture a steering wheel of the vehicle, setting a division standard to divide a steering wheel region, and setting standard positions of hands of the driver on the steering wheel;

sending a first instruction in response to receiving a press signal from the button;

controlling the camera to capture a face image of the driver at the first angle according to the first instruction;

identifying a facial region in the face image, locating an eye region from the facial region, and calculating a ratio of a height and a width of the eye region;

determining that the driver is not awake if the calculated ratio is not larger than the threshold value, and invoking a second instruction;

controlling the camera to capture a first image of the steering wheel at the second angle according to the second instruction;

identifying a steering wheel region and two hand regions, dividing the steering wheel region into a plurality of sub regions according to the division standard, and confirming one or more sub regions corresponding to the two hand regions; and determining that the driver drives the vehicle appropriately if the confirmed sub regions match the standard positions; or determining that the driver drives the vehicle inappropriately if the confirmed sub regions do not match the standard positions, and outputting alert signals to prompt the driver.

2. The method according to claim 1, wherein the division standard divides the steering wheel region into a left upper sub region, a left lower sub region, a right upper sub region, and a right lower sub region according to two perpendicular lines.

3. The method according to claim 2, wherein the standard positions of the hands of the driver on the steering wheel comprise a left hand of the driver on the left upper sub region while the right hand of the driver on the right lower sub region, and the left hand of the driver on the left lower sub region while the right hand of the driver on the right upper sub region.

4. The method according to claim 1, further comprising:
setting a comparison proportion; and
confirming a sub region corresponding to a hand region if a proportion between acreages of the hand region and the sub region is larger than the comparison proportion.

5. The method according to claim 1, further comprising:
setting a time interval to determine if the driver has adjusted a driving pose;
activating a timer of the driving monitoring device to start timing if the driver drives the vehicle inappropriately;
invoking the second instruction when the time interval has been reached;
controlling the camera to capture a second image of the steering wheel at the second angle according to the second instruction;
identifying a steering wheel region and two hand regions in the second image, dividing the steering wheel region into a plurality of sub regions according to the division standard, and confirming one or more sub regions corresponding to the two hand regions; and
determining that the driver has not adjusted the driving pose if the confirmed sub regions do not match the standard positions, and cutting off an accelerator of the vehicle.

6. The method according to claim 5, further comprising:
determining that the driver has adjusted the driving pose if the confirmed sub regions match the standard positions, and stopping outputting the alert signals.

7. A driving monitoring device in a vehicle, the driving monitoring device comprising:
a camera;
a storage device;
a button;
at least one processor; and
one or more programs stored in the storage device and being executable by the at least one processor, the one or more programs comprising:

a setting module operable to set a first angle of the camera to capture a face of a driver, set a threshold value to determine if the driver is awake, set a second angle of the camera to capture a steering wheel of the vehicle, set a division standard to divide a steering wheel region, and set standard positions of hands of the driver on the steering wheel;

an activation module operable to send a first instruction in response to receiving a press signal from the button;

a control module operable to control the camera to capture a face image of the driver at the first angle according to the first instruction; and an identification module operable to identify a facial region in the face image, locate an eye region from the facial region, and calculate a ratio of a height and a width of the eye region;

a determination module operable to determine that the driver is not awake if the calculated ratio is not larger than the threshold value;

the activation module is further operable to invoke a second instruction;

the control module further operable to control the camera to capture a first image of the steering wheel at the second angle according to the second instruction;

the identification module further operable to identify a steering wheel region and two hand regions, divide the steering wheel region into a plurality of sub regions according to the division standard, and confirm one or more sub regions corresponding to the two hand regions;

the determination module further operable to determine that the driver drives the vehicle appropriately if the confirmed sub regions match the standard positions; and an alert module operable to output alert signals to prompt the driver if the confirmed sub regions do not match the standard positions.

8. The driving monitoring device according to claim 7, wherein the division standard divides the steering wheel region into a left upper sub region, a left lower sub region, a right upper sub region, and a right lower sub region according to two perpendicular lines.

9. The driving monitoring device according to claim 8, wherein the standard positions of the hands of the driver on the steering wheel comprise a left hand of the driver on the left upper sub region while the right hand of the driver on the right lower sub region, and the left hand of the driver on the left lower sub region while the right hand of the driver on the right upper sub region.

10. The driving monitoring device according to claim 7, wherein the setting module is further operable to set a comparison proportion, and the identification module is further operable to confirm a sub region corresponding to a hand region if a proportion between acreages of the hand region and the sub region is larger than the comparison proportion.

11. The driving monitoring device according to claim 7, wherein the alert signals comprise audio alert signals output by a speaker of the driving monitoring device.

12. The driving monitoring device according to claim 7, wherein the one or more programs further comprise a timer:
the setting module is further operable to set a time interval to determine if the driver has adjusted a driving pose;
the timer is operable to start timing if the driver drives the vehicle inappropriately;

the activation module is further operable to invoke the second instruction when the time interval has been reached;

the control module is further operable to control the camera to capture a second image of the steering wheel at the second angle according to the second instruction;

the identification module is further operable to identify a steering wheel region and two hand regions in the second image, divide the steering wheel region into a plurality of sub regions according to the division standard, and confirm one or more sub regions corresponding to the hand regions;

the determination module is further operable to determine that the driver has not adjusted the driving pose if the confirmed sub regions do not match the standard positions; and the alert module is further operable to cut off an accelerator of the vehicle.

13. A non-transitory storage medium storing a set of instructions, the set of instructions capable of being executed by a processor to perform a driving monitoring method using a driving monitoring device in a vehicle, the driving monitoring device comprising a camera and a button, the method comprising: setting a first angle of the camera to capture a face of a driver, and setting a threshold value to determine if the driver is awake; setting a second angle of the camera to capture a steering wheel of the vehicle, setting a division standard to divide a steering wheel region, and setting standard positions of hands of the driver on the steering wheel; sending a first instruction in response to receiving a press signal from the button; controlling the camera to capture a face image of the driver at the first angle according to the first instruction; identifying a facial region in the face image, locating an eye region from the facial region, and calculating a ratio of a height and a width of the eye region; determining that the driver is not awake if the calculated ratio is not larger than the threshold value, and invoking a second instruction; controlling the camera to capture a first image of the steering wheel at the second angle according to the second instruction; identifying a steering wheel region and two hand regions, dividing the steering wheel region into a plurality of sub regions according to the division standard, and confirming one or more sub regions corresponding to the two hand regions; and determining that the driver drives the vehicle appropriately if the confirmed sub regions match the standard positions; or determining that the driver drives the vehicle inappropriately if the confirmed sub regions do not match the standard positions, and outputting alert signals to prompt the driver.

14. The storage medium as claimed in claim 13, wherein the division standard divides the steering wheel region into a left upper sub region, a left lower sub region, a right upper sub region, and a right lower sub region according to two perpendicular lines.

15. The storage medium as claimed in claim 14, wherein the standard positions of the hands of the driver on the steering wheel comprise a left hand of the driver on the left upper sub region while the right hand of the driver on the right lower sub region, and the left hand of the driver on the left lower sub region while the right hand of the driver on the right upper sub region.

16. The storage medium as claimed in claim 13, wherein the method further comprises:
setting a comparison proportion; and
confirming a sub region corresponding to a hand region if a proportion between acreages of the hand region and the sub region is larger than the comparison proportion.

17. The storage medium as claimed in claim 13, wherein the method further comprises:
setting a time interval to determine if the driver has adjusted a driving pose;
activating a timer of the driving monitoring device to start timing if the driver drives the vehicle inappropriately;
invoking the second instruction when the time interval has been reached;
controlling the camera to capture a second image of the steering wheel at the second angle according to the second instruction;
identifying a steering wheel region and two hand regions in the second image, dividing the steering wheel region into a plurality of sub regions according to the division standard, and confirming one or more sub regions corresponding to the hand regions; and
determining that the driver has not adjusted the driving pose if the confirmed sub regions do not match the standard positions, and cutting off an accelerator of the vehicle.

18. The storage medium as claimed in claim 17, wherein the method further comprises:
determining that the driver has adjusted the driving pose if the confirmed sub regions match the standard positions, and stopping outputting the alert signals.

* * * * *